(12) United States Patent
Luo

(10) Patent No.: US 12,547,034 B2
(45) Date of Patent: Feb. 10, 2026

(54) DISPLAY MODULE AND DISPLAY DEVICE

(71) Applicant: WUHAN CHINA STAR OPTOELECTRONICS TECHNOLOGY CO., LTD., Hubei (CN)

(72) Inventor: Chengzhi Luo, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 497 days.

(21) Appl. No.: 17/999,573

(22) PCT Filed: Nov. 10, 2022

(86) PCT No.: PCT/CN2022/130999
§ 371 (c)(1),
(2) Date: Nov. 22, 2022

(87) PCT Pub. No.: WO2024/036774
PCT Pub. Date: Feb. 22, 2024

(65) Prior Publication Data
US 2025/0093712 A1  Mar. 20, 2025

(30) Foreign Application Priority Data
Aug. 16, 2022  (CN) .......................... 202210978189.6

(51) Int. Cl.
*G02F 1/1362* (2006.01)
*G02F 1/1335* (2006.01)
*G02F 1/13357* (2006.01)

(52) U.S. Cl.
CPC .. *G02F 1/136209* (2013.01); *G02F 1/133553* (2013.01); *G02F 1/133602* (2013.01); *G02F 1/136286* (2013.01)

(58) Field of Classification Search
CPC ......... G02F 1/136209; G02F 1/133553; G02F 1/133602; G02F 1/136286
(Continued)

(56) References Cited

U.S. PATENT DOCUMENTS

2023/0213809 A1* 7/2023 Wan .................. G02F 1/133528
349/96

FOREIGN PATENT DOCUMENTS

| CN | 106842736 A | 6/2017 | |
| CN | 107256872 A * | 10/2017 | ....... G02F 1/136209 |

(Continued)

OTHER PUBLICATIONS

International Search Report in International application No. PCT/CN2022/130999, mailed on Mar. 7, 2023.
(Continued)

*Primary Examiner* — Michael H Caley

(57) ABSTRACT

The disclosure provides a display module and a display device. A front projection of a reflective light-shielding layer on a substrate and corresponding a display region is located within a coverage of a front projection of a black matrix on the substrate and corresponding to the display region, and a ratio of a front projection area of the reflective light-shielding layer on the substrate and corresponding to the display region to a front projection area of the black matrix on the substrate and corresponding to the display region is greater than 20%.

20 Claims, 7 Drawing Sheets

(58) Field of Classification Search
USPC .......................................................... 349/56
See application file for complete search history.

(56) References Cited

FOREIGN PATENT DOCUMENTS

| | | | |
|---|---|---|---|
| CN | 107632453 | A | 1/2018 |
| CN | 110752221 | A | 2/2020 |
| CN | 112987423 | A | 6/2021 |
| CN | 113156651 | A | 7/2021 |
| CN | 114200713 | A | 3/2022 |
| JP | 11160692 | A | 6/1999 |
| JP | 2001222001 | A | 8/2001 |

OTHER PUBLICATIONS

Written Opinion of the International Search Authority in International application No. PCT/CN2022/130999, mailed on Mar. 7, 2023.
Chinese Office Action issued in corresponding Chinese Patent Application No. 202210978189.6 dated Jan. 16, 2025, pp. 1-8.

* cited by examiner

DISPLAY MODULE AND DISPLAY DEVICE

TECHNICAL FIELD

The present disclosure relates to a field of mobile communication technology, and in particular, to a display module and a display device including the same.

BACKGROUND

A liquid crystal display (LCD) displays an image by changing an orientation of liquid crystal molecules to control an intensity of transmitted light by adjusting an electric field strength. Currently, the liquid crystal display has been widely used in various large, medium, or small-sized terminal display devices due to their light weight, small volume, and thin thickness.

In the liquid crystal display, the light efficiency refers to the ratio of the light intensity before and after the light from the backlight passes through the panel. In the conventional liquid crystal display, due to the influence of the refractive index and the light transmittance of respective film layer in the panel, the light efficiency of the conventional liquid crystal display is only 3 to 10%, and more than 90% of the light cannot be utilized.

Therefore, the utilization rate of light in the conventional liquid crystal display is extremely low.

SUMMARY

Technical Problems

An embodiment of the present disclosure provides a display module and a display device, which may improve the light efficiency of the display module by improving the utilization ratio of the display module for the light from the backlight assembly.

Technical Solutions

An embodiment of the present disclosure provides a display module including:
a substrate;
a reflective light-shielding layer disposed on the substrate;
a thin film transistor layer disposed on a side of the reflective light-shielding layer away from the substrate;
a black matrix disposed on a side of the thin film transistor layer away from the reflective light-shielding layer; and
a backlight assembly disposed on a side of the substrate away from the reflective light-shielding layer;
wherein the display module includes a display region, a front projection of the reflective light-shielding layer on the substrate and corresponding to the display region is disposed within a coverage of a front projection of the black matrix on the substrate and corresponding to the display region, and a ratio of a front projection area of the reflective light-shielding layer on the substrate and corresponding to the display region to a front projection area of the black matrix on the substrate and corresponding to the display region is greater than 20%

In an embodiment of the present disclosure, the ratio of the front projection area of the reflective light-shielding layer on the substrate and corresponding to the display region to the front projection area of the black matrix on the substrate and corresponding to the display region is greater than or equal to 80% and less than or equal to 100%.

In an embodiment of the present disclosure, the display module includes a plurality of sub-pixel region groups disposed in the display region and arranged in a first direction, a plurality of sub-pixel regions arranged in a second direction are disposed in each of the sub-pixel region groups, and the first direction crosses the second direction;
the reflective light-shielding layer includes a plurality of first reflective light-shielding portions and at least one second reflective light-shielding portion;
the thin film transistor layer includes a plurality of data lines and a plurality of scan lines, a data line is disposed between any two adjacent sub-pixel regions in each of the sub-pixel region groups, and a scan line is disposed between any two adjacent sub-pixel region groups; and
a first reflective light-shielding portion is disposed between any two adjacent sub-pixel region groups, and a second reflective light-shielding portion is disposed between two adjacent sub-pixel regions in at least one of the sub-pixel region groups.

In an embodiment of the present disclosure, the reflective light-shielding layer includes a plurality of the second reflective light-shielding portions, and the second reflective light-shielding portion is disposed between every two adjacent sub-pixel regions in each of the sub-pixel region groups.

In an embodiment of the present disclosure, each of the first reflective light-shielding portions is disposed between any two adjacent sub-pixel region groups and extends in the second direction; and
each of the second reflective light-shielding portions is disposed between any two adjacent sub-pixel regions in a sub-pixel region group and between two adjacent first reflective light-shielding portions in the first direction.

In an embodiment of the present disclosure, a front projection of the data line on the substrate and a front projection of the scan line on the substrate are both located within a coverage (or range) of the front projection of the reflective light-shielding layer on the substrate.

In an embodiment of the present disclosure, each of the second reflective light-shielding portions is connected between two first reflective light-shielding portions adjacent in the first direction, so that the plurality of first reflective light-shielding portions and the plurality of second reflective light-shielding portions are disposed around each of the sub-pixel regions.

In an embodiment of the disclosure, the first reflective light-shielding portion and the second reflective light-shielding portion are disposed apart from each other.

In an embodiment of the present disclosure, each of the first reflective light-shielding portions includes a plurality of first sub-portions arranged at intervals, and the plurality of first sub-portions in the same first reflective light-shielding portion are arranged in the second direction.

In an embodiment of the present disclosure, a plurality of first sub-portions in one of two adjacent first reflective light-shielding portions and a plurality of first sub-portions in another of the two adjacent first reflective light-shielding portions are disposed in one-to-one correspondence;
wherein at least six sub-pixel regions arranged in the second direction are disposed between two oppositely disposed first sub-portions of the two adjacent first reflective light-shielding portions.

In an embodiment of the present disclosure, the thin film transistor layer further includes a plurality of touch lines, the second reflective light-shielding portion includes a second sub-portion and a third sub-portion, and a width of the second sub-portion in the second direction is larger than a width of the third sub-portion in the second direction; and
wherein one touch line, one data line and one second sub-portion are disposed between any two adjacent sub-pixel regions in each of the sub-pixel region groups, and both the one touch line and the one data line are disposed to at least partially overlapp with the one second sub-portion; or
one data line and one third sub-portion are disposed between any two adjacent sub-pixel regions in each of the sub-pixel region groups, and the one data line is correspondingly disposed to at least partially overlapp with the one third sub-portion.

In an embodiment of the present disclosure, the second sub-portion includes a first unit and a second unit spaced apart in the second direction, and wherein the first unit is at least partially overlapped with the data line and the second unit is at least partially overlapped with the touch line.

In an embodiment of the present disclosure, a width of the first reflective light-shielding portion in the first direction is greater than a width of the scan line in the first direction, and a width of the second reflective light-shielding portion in the second direction is greater than a sum of a width of the data line in the second direction and a width of the touch line in the second direction.

In an embodiment of the present disclosure, the black matrix includes a plurality of openings, one of the openings corresponds to one of the sub-pixel regions; and
wherein a difference between a distance between two adjacent openings in the first direction and a width of the first reflective light-shielding portion in the first direction is greater than or equal to 0.5 μm and less than or equal to 2 μm; and
a difference between a distance between two openings adjacent in the second direction and a width of the second reflective light-shielding portion in the second direction is greater than or equal to 0.5 μm and less than or equal to 2 μm.

In an embodiment of the present disclosure, the thin film transistor layer further includes a thin film transistor disposed in the display region, and the reflective light-shielding layer is disposed between the thin film transistor and the substrate.

In an embodiment of the present disclosure, a ratio of the front projection area of the reflective light-shielding layer on the substrate and corresponding to the display region to an area of the display region is greater than or equal to 25% and less than or equal to 90%.

In an embodiment of the present disclosure, the ratio of the front projection area of the reflective light-shielding layer on the substrate and corresponding to the display region to the area of the display region is greater than or equal to 25% and less than or equal to 70%.

According to the above object of the present disclosure, an embodiment of the present disclosure further provides a display device including a device main body, and a display module, wherein the device main body and the display module are integrated; and
the display module includes:
a substrate;
a reflective light-shielding layer disposed on the substrate;
a thin film transistor layer disposed on a side of the reflective light-shielding layer away from the substrate;
a black matrix disposed on a side of the thin film transistor layer away from the reflective light-shielding layer; and
a backlight assembly disposed on a side of the substrate away from the reflective light-shielding layer;
wherein the display module includes a display region, a front projection of the reflective light-shielding layer on the substrate and corresponding the display region is located within a coverage of a front projection of the black matrix on the substrate and corresponding to the display region, and a ratio of a front projection area of the reflective light-shielding layer on the substrate and corresponding to the display region to a front projection area of the black matrix on the substrate and corresponding to the display region is greater than 20%.

In an embodiment of the present disclosure, the ratio of the front projection area of the reflective light-shielding layer on the substrate and corresponding to the display region to the front projection area of the black matrix on the substrate and corresponding to the display region is greater than or equal to 80% and less than or equal to 100%.

In an embodiment of the present disclosure, the display module includes a plurality of sub-pixel region groups disposed in the display region and arranged in a first direction, a plurality of sub-pixel regions arranged in a second direction are disposed in each of the sub-pixel region groups, and the first direction crosses the second direction;
the reflective light-shielding layer includes a plurality of first reflective light-shielding portions and at least one second reflective light-shielding portion;
the thin film transistor layer includes a plurality of data lines and a plurality of scan lines, a data line is disposed between any two adjacent sub-pixel regions in each of the sub-pixel region groups, and a scan line is disposed between any two adjacent sub-pixel region groups; and
wherein a first reflective light-shielding portion is disposed between any two adjacent sub-pixel region groups, and a second reflective light-shielding portion is disposed between two adjacent sub-pixel regions in at least one of the sub-pixel region groups.

Advantageous Effects

Advantageous effects of the present disclosure are as follows: compared with the prior art, in the present disclosure, the ratio of the front projection area of the reflective light-shielding layer on the substrate to the front projection area of the black matrix on the substrate is greater than 20%, which increases the area ratio of the reflective light-shielding layer in the display region, increase the reflectivity of the reflective light-shielding layer to the light emitted by the backlight assembly, and improve the utilization rate of the display module for the light emitted from the backlight assembly, thereby improving the light efficiency of the display module, and reducing the power consumption of the display module. Furthermore, the front projection of the reflective light-shielding layer on the substrate is located within the coverage of the front projection of the black matrix on the substrate, that is, the present disclosure can prevent the reflective light-shielding layer from exceeding the coverage of the black matrix, thereby preventing the reflective light-shielding layer from causing reflection on the display surface side of the display module, and improving the display effect of the display module.

DESCRIPTION OF DRAWINGS

The technical solution and other beneficial effects of the present disclosure will be apparent from the following detailed description of specific embodiments of the disclosure, taken in conjunction with the accompanying drawings.

DETAILED DESCRIPTION OF EMBODIMENTS

Figure 1:
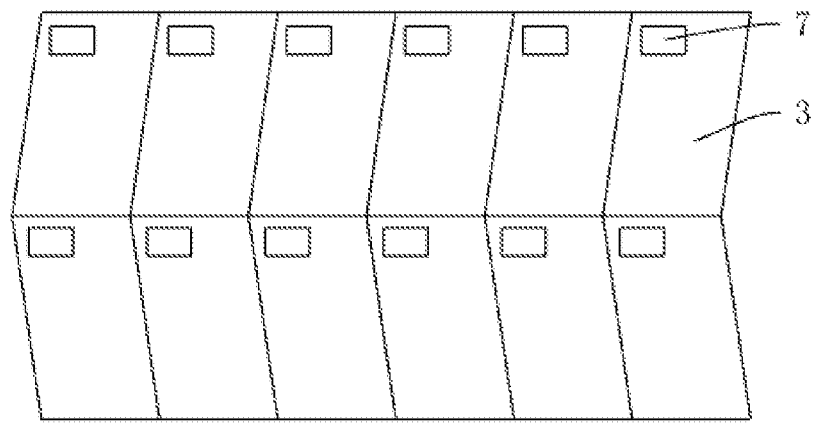
FIG. 1 is a schematic structural diagram of a display module according to an embodiment of the present disclosure.

Technical solutions in embodiments of the present disclosure will be clearly and completely described below in conjunction with drawings in the embodiments of the present disclosure. Obviously, the described embodiments are only a part of embodiments of the present disclosure, rather than all the embodiments. Based on the embodiments in the present disclosure, all other embodiments obtained by those skilled in the art without creative work fall within the protection scope of the present disclosure.

The following description provides various embodiments or examples for implementing various structures of the present disclosure. To simplify the description of the present disclosure, parts and settings of specific examples are described as follows. Certainly, they are only illustrative, and are not intended to limit the present disclosure. Further, reference numerals and reference letters may be repeated in different examples. This repetition is for purposes of simplicity and clarity and does not indicate a relationship of the various embodiments and/or the settings. Furthermore, the present disclosure provides specific examples of various processes and materials, however, applications of other processes and/or other materials may be appreciated those skilled in the art.

Figure 2:
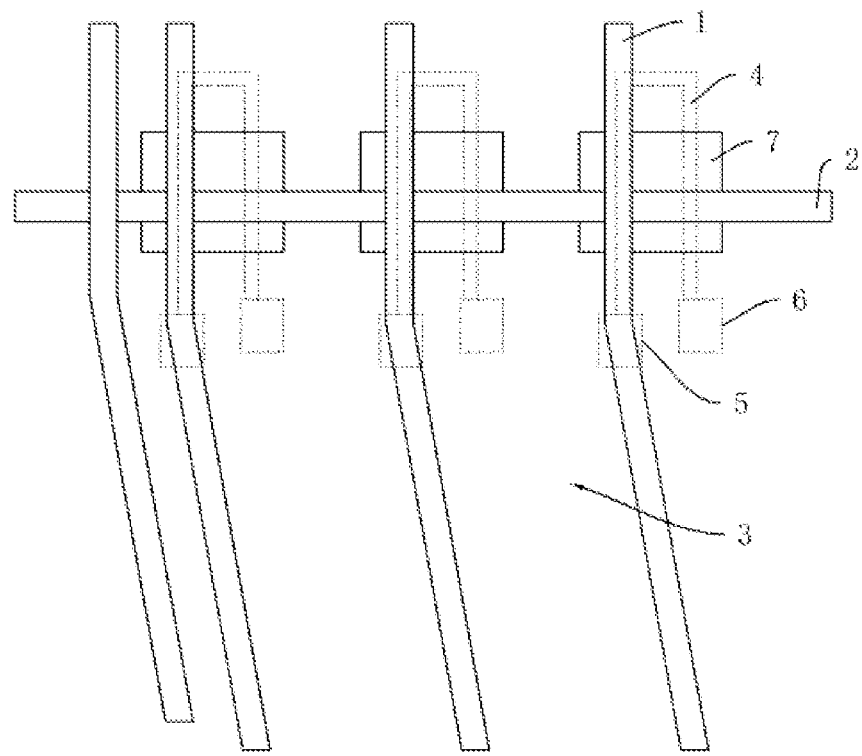
FIG. 2 is a schematic structural diagram of a reflective light-shielding layer according to an embodiment of the present disclosure.

Referring to FIGS. 1 and 2, in the display panel of related art, a plurality of data signal lines 1 and a plurality of scan signal lines 2 cross vertically or horizontally so as to define a plurality of sub-pixel regions 3 in the display panel, and each of the sub-pixel regions 3 is provided with a thin film transistor, which may specifically include an active layer 4, a source electrode 5, and a drain electrode 6. In the related art, in order to prevent light from being irradiated on the active layer 4 to affect the stability of the thin film transistor, a light-shielding layer 7 is usually provided below the active layer 4 so as to block light. Therefore, in the related art, the light-shielding layer 7 is provided merely below the active layer 4, and has a relatively small area ratio and a low reflectivity for light.

Figure 3:
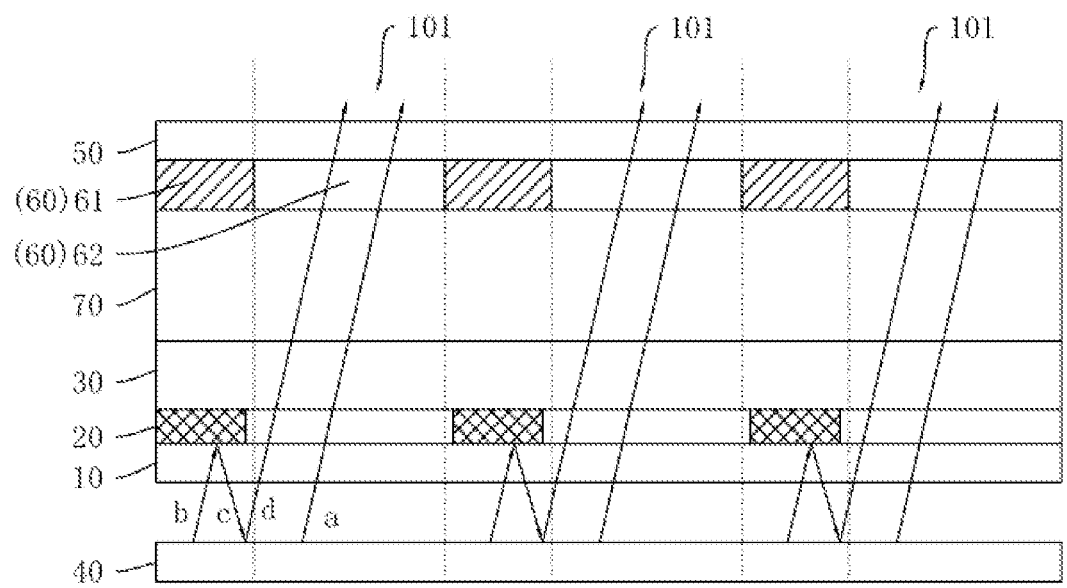
FIG. 3 is a schematic diagram of a planar distribution structure of a reflective light-shielding layer and a thin film transistor layer according to an embodiment of the present disclosure.

Referring to FIG. 3, an embodiment of the present disclosure provides a display module including a display region. The display module further includes a substrate 10, a reflective light-shielding layer 20, a thin film transistor layer 30, and a backlight assembly 40. The reflective light-shielding layer 20 is provided on the substrate 10. The thin film transistor layer 30 is provided on a side of the reflective light-shielding layer 20 away from the substrate 10. A black matrix 61 is provided on a side of the thin film transistor layer 30 away from the reflective light-shielding layer 20. The backlight assembly 40 is disposed on a side of the substrate 10 away from the reflective light-shielding layer 20.

Further, a front projection (or orthographic projection) of the reflective light-shielding layer 20 on the substrate 10 and corresponding to the display region is located within a coverage area of a front projection of the black matrix 61 on the substrate 10 and corresponding to the display region, and the ratio of the front projection area of the reflective light-shielding layer 20 on the substrate 10 and corresponding to the display region to the front projection area of the black matrix 61 on the substrate 10 and corresponding to the display region is greater than 20%.

In the implementation and application of the embodiment of the present disclosure, by increasing the area proportion of the reflective light-shielding layer 20 in the display region, the ratio of the front projection area of the reflective light-shielding layer 20 on the substrate 10 to the front projection area of the black matrix 61 on the substrate 10 is greater than 20%, so as to improve the reflectivity of the reflective light-shielding layer 20 to the light emitted by the backlight assembly 40, thereby improving the light utilization ratio of the display module to the backlight assembly 40, improving the light efficiency of the display module, and reducing the power consumption of the display module. Further, the front projection of the reflective light-shielding layer 20 on the substrate 10 is located within the coverage area of the front projection of the black matrix 61 on the substrate 10, that is, the present disclosure can prevent the reflective light-shielding layer 20 from exceeding the coverage area of the black matrix 61, thereby preventing the reflective light-shielding layer 20 from causing reflection on the display surface side of the display module, and improving the display effect of the display module.

Figure 4:
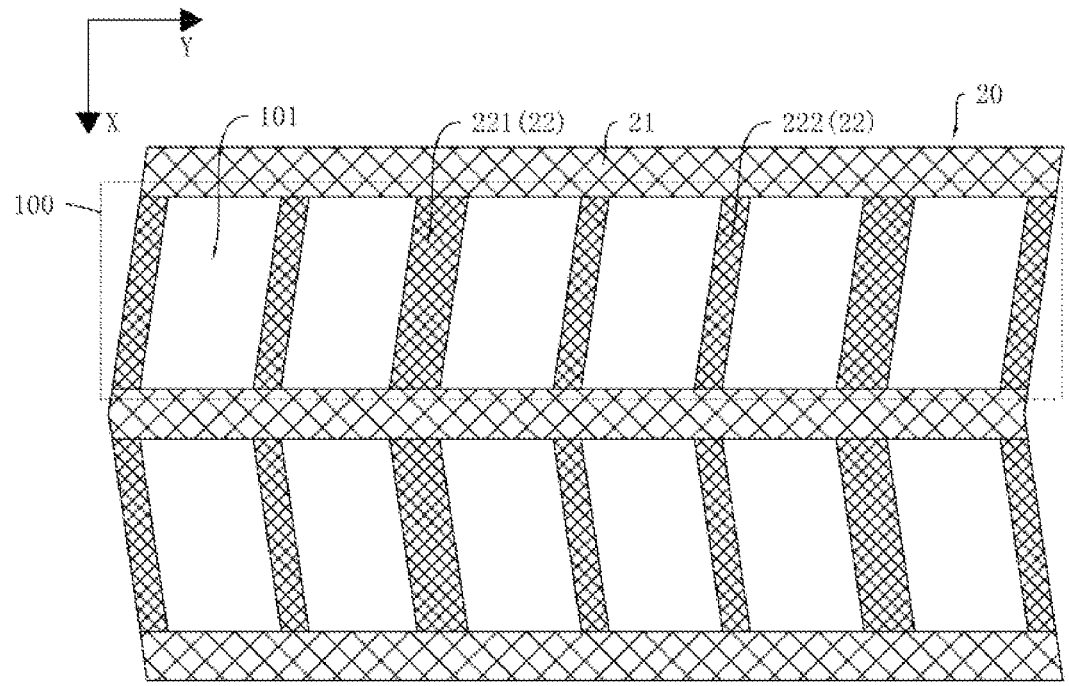
FIG. 4 is a schematic diagram of a distribution structure of a sub-pixel region and a light-shielding layer in the related art.
Figure 5:
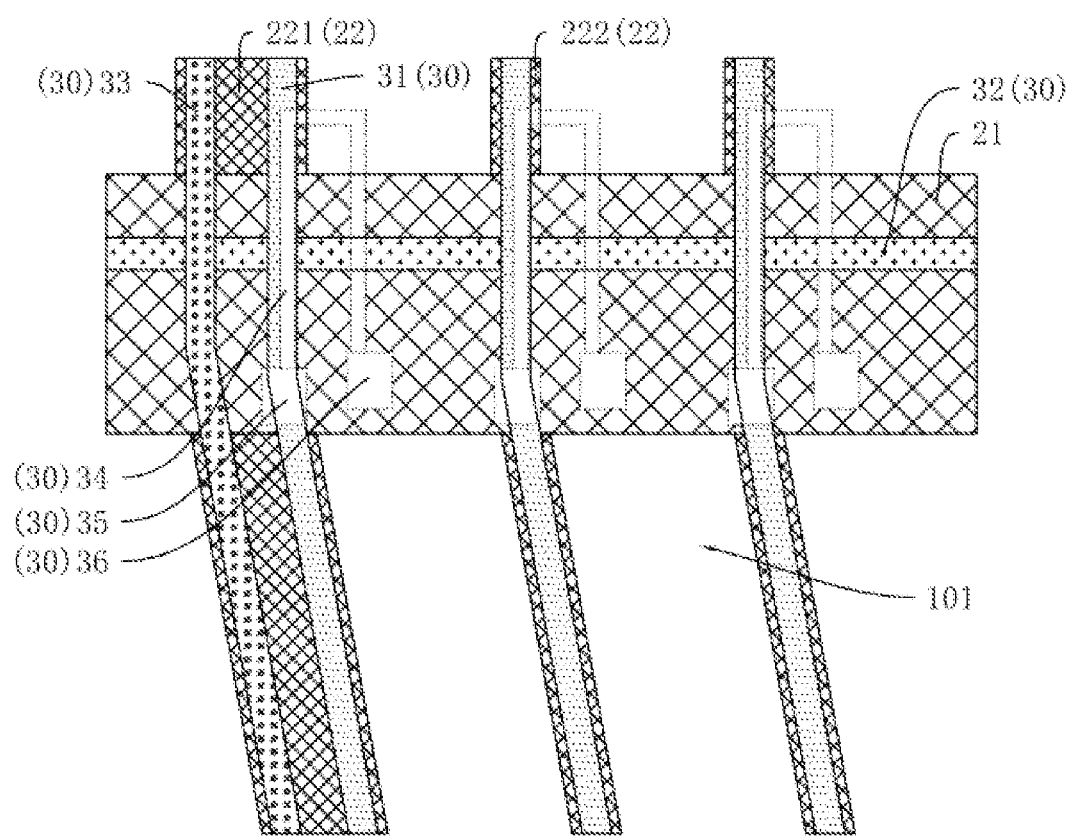
FIG. 5 is a schematic structural diagram of a sub-pixel region in the related art.

Further, referring to FIGS. 3, 4, and 5, an embodiment of the present disclosure provides a display module including a plurality of sub-pixel region groups 100 disposed in a display region and arranged in a first direction X, each of the sub-pixel region groups 100 includes a plurality of sub-pixel regions 101 arranged in a second direction Y, and the first direction X crosses the second direction Y.

The reflective light-shielding layer 20 includes a plurality of first reflective light-shielding portions 21 and at least one second reflective light-shielding portion 22. The thin film transistor layer 30 includes a plurality of data lines 31 disposed between any two adjacent sub-pixel regions 101 within each sub-pixel region group 100 and a plurality of scan lines 32 disposed between any two adjacent sub-pixel region groups 100.

Further, the first reflective light-shielding portion 21 is provided between any two adjacent sub-pixel region groups 100, and the second reflective light-shielding portion 22 is provided between two adjacent sub-pixel regions 101 in at least one sub-pixel region group 100.

The structure distribution of the reflective light-shielding layer 20 in the display module provided in the present disclosure will be described in detail with reference to the specific embodiments.

Specifically, in an embodiment of the present disclosure, please continue to refer to FIGS. 3, 4, and 5, the display module includes the plurality of sub-pixel region groups 100 arranged in the first direction X, and the plurality of sub-pixel regions 101 arranged in the second direction Y are provided in each of the sub-pixel region groups 100. The first direction X crosses the second direction Y. The angle between the first direction X and the second direction Y is clear and not necessarily limited in the embodiment of the present disclosure, and the angle between the first direction X and the second direction Y is 90 degree as an example for description.

Further, the display module further includes the substrate 10, the reflective light-shielding layer 20 disposed on the substrate 10, the thin film transistor layer 30 disposed on the reflective light-shielding layer 20, an opposing substrate 50 disposed on a side of the thin film transistor layer 30 away from the substrate 10, a color filter layer 60 disposed on a side of the opposing substrate 50 close to the thin film transistor layer 30, a liquid crystal layer 70 disposed between the color filter layer 60 and the thin film transistor layer 30, and the backlight assembly 40 disposed on the side of the substrate 10 away from the reflective light-shielding layer 20.

The thin film transistor layer 30 includes the plurality of data lines 31 and the plurality of scan lines 32, and each of the data lines 31 is disposed between any two adjacent sub-pixel regions 101 in each sub-pixel region group 100 correspondingly, and each of the scan lines 32 is disposed between any two adjacent sub-pixel region groups 100 correspondingly. Specifically, there is one data line 31 between any two adjacent sub-pixel regions 101 in each of the sub-pixel region groups 100, and there is one scan line 32 between any two adjacent sub-pixel region groups 100.

In addition, the thin film transistor layer 30 further includes a thin film transistor disposed corresponding to each sub-pixel region 101, and the thin film transistor may include a gate (not shown), an active layer 34, a source 35, and a drain 36. The active layer 34 may be disposed above the gate, and both the source 35 and the drain 36 may be disposed above and overlapped with both ends of the active layer 34. Further, the reflective light-shielding layer 20 is located between the thin film transistor and the substrate 10, and may be specifically located between the active layer 34 and the substrate 10.

It may be appreciated that the plurality of data lines 31 and the plurality of scan lines 32 may cross vertically or horizontally to be disposed around each sub-pixel region 101, and one data line 31 and one scan line 32 are disposed corresponding to one sub-pixel region 101 to transmit a data signal(s) and a scan signal(s) to the sub-pixel region 101. Specifically, the gate corresponding to each sub-pixel region 101 is connected to a corresponding scan line 32, and the source 35 is connected to a corresponding one of the data lines 31.

Alternatively, the sources 35 and the drains 36 may be arranged in the same layer as the plurality of data lines 31, and the gates may be arranged in the same layer as the plurality of scan lines 32. Further, the thin film transistor layer 30 may further include a pixel electrode layer (not shown) disposed above the source 35 and the drain 36, and the pixel electrode layer may include a plurality of pixel electrodes, each of which is correspondingly disposed in one sub-pixel region 101 and is electrically connected to the drain 36 of the corresponding sub-pixel region 101 to transmit the data signal from the data line 31 to the pixel electrode to control the deflection of the liquid crystal molecules in the liquid crystal layer corresponding to the sub-pixel region 101, thereby realizing the display function of the display module.

Further, the reflective light-shielding layer 20 is provided between the substrate 10 and the thin film transistor layer 30. Specifically, the reflective light-shielding layer 20 includes the plurality of first reflective light-shielding portions 21 and at least one second reflective light-shielding portion 22. The first reflective light-shielding portion 21 is provided between any two adjacent sub-pixel region groups 100, and the second reflective light-shielding portion 22 is provided between two adjacent sub-pixel regions 101 in the at least one sub-pixel region group 100.

In the present embodiment, the reflective light-shielding layer 20 includes a plurality of second reflective light-shielding portions 22, and the second reflective light-shielding portion 22 is provided between any two adjacent sub-pixel regions 101 in each of the sub-pixel region groups 100.

Each of the first reflective light-shielding portions 21 is disposed between two adjacent sub-pixel region groups 100 and extends in the second direction Y. Each of the second reflective light-shielding portions 22 is disposed between two adjacent sub-pixel regions 101 in the corresponding sub-pixel region group 100, and between two first reflective light-shielding portions 21 adjacent in the first direction X.

Specifically, each of the second reflective light-shielding portions 22 is connected between two first reflective light-shielding portions 21 adjacent in the first direction X, so that the plurality of first reflective light-shielding portions 21 and the plurality of second reflective light-shielding portions 22 are disposed around respective sub-pixel region 101, as shown in FIG. 4.

Optionally, the material of the reflective light-shielding layer 20 includes at least one of Mo, Ti, or Al. Since the reflectivity of Al is higher, the material of the reflective light-shielding layer 20 in this embodiment is preferably Al.

Further, the backlight assembly 40 is disposed on the side of the substrate 10 away from the reflective light-shielding layer 20, and the backlight assembly 40 is arranged to emit light from the side thereof close to the substrate 10. Alternatively, the backlight assembly 40 includes a backlight source and an optical film sheet group, and specifically, the optical film sheet group may include an optical film such as a light guide plate, a reflective sheet and so on, which is not limited herein.

In the embodiment of the present disclosure, a second reflective light-shielding portion 22 located between two adjacent sub-pixel regions 101 in at least one sub-pixel region group 100 is added to the reflective light-shielding layer 20, so that the reflectivity of the reflective light-shielding layer 20 for the light emitted from the backlight assembly 40 is improved, the utilization rate of the display module 20 for the light emitted from the backlight assembly 40 is improved, the light efficiency of the display module may be improved, and the power consumption of the display module may be reduced. The first reflective light-shielding portion 21 and the second reflective light-shielding portion 22 are disposed outside each of the sub-pixel regions 101 in the embodiment of the present disclosure, so that the reflective light-shielding layer 20 does not affect the light transmission in each of the sub-pixel regions 101 when reflecting the light output from the backlight assembly 40. Therefore, the embodiment of the present disclosure improves the backlight utilization rate of the non-opening region and improves the light efficiency of the display module while ensuring the aperture rate of the display module.

Further, both the front projection of the data line 31 on the substrate 10 and the front projection of the scan line 32 on the substrate 10 are located within the coverage of the front projection of the reflective light-shielding layer 20 on the substrate 10. In addition, the front projections of the source 35, the drain 36, and a portion of the active layer 34 on the substrate 10 may be located within the coverage of the front projection of the reflective light-shielding layer 20 on the substrate 10.

The display module according to an embodiment of the present disclosure further includes the color filter layer 60 disposed between the liquid crystal layer 70 and the opposing substrate 50, and the color filter layer 60 includes a black matrix 61 and a plurality of color filters 62. Among them, the black matrix 61 includes a plurality of openings, and each of the color filters 62 is disposed in one opening.

It should be noted that each of the openings corresponds to one sub-pixel region 101 so that the light output from each sub-pixel region 101 passes through each color filter 62 so that each sub-pixel region 101 may emit light of a corresponding color. Alternatively, the plurality of color filters 62 may include red filters, green filters, and blue filters.

In an embodiment of the present disclosure, the front projection of the reflective light-shielding layer 20 on the substrate 10 is located within the coverage of the front projection of the black matrix 61 on the substrate 10. That is, the reflective light-shielding layer 20 does not exceed the coverage of the black matrix 61, so as to prevent the reflective light-shielding layer 20 from affecting the light output from each sub-pixel region 101; and the ratio of the front projection area of the reflective light-shielding layer 20 on the substrate 10 to the front projection area of the black matrix 61 on the substrate 10 is greater than 20%.

Optionally, the ratio of the front projection area of the reflective light-shielding layer 20 on the substrate 10 and corresponding to the display region to the front projection area of the black matrix 61 on the substrate 10 and corresponding to the display region is greater than or equal to 80% and less than or equal to 100%. Further, the difference between the distance between two adjacent openings in the first direction X and the width of the second reflective light-shielding portion 22 in the first direction X is greater than or equal to 0.5 μm and less than or equal to 2 μm; and the difference between the distance between the two openings adjacent in the second direction Y and the width of the second reflective light-shielding portion 22 in the second direction Y is greater than or equal to 0.5 μm and less than or equal to 2 μm.

In addition, the thin film transistor layer 30 further includes a plurality of touch lines 33, and one touch line 33 is provided between every two adjacent sub-pixel regions 101 in some adjacent sub-pixel regions 101 in each sub-pixel region group 100, for example, one touch line 33 is provided every three sub-pixel regions 101 in each sub-pixel region group 100. The number of the sub-pixel regions 101 between adjacent touch lines 33 is not limited herein, and may be selected as needed.

The second reflective light-shielding portion 22 includes a second sub-portion 221 and a third sub-portion 222, and a width of the second sub-portion 221 in the second direction Y is larger than a width of the third sub-portion 222 in the second direction Y.

One touch line 33, one data line 31, and one second sub-portion 221 are provided between any two adjacent sub-pixel regions 101 in each sub-pixel region group 100, and the one touch line 33 and the one data line 31 are at least partially overlapped with the corresponding one second sub-portion 221. Alternatively, one data line 31 and one third sub-portion 222 are provided between any two adjacent sub-pixel regions 101 in each sub-pixel region group 100, and the one data line 31 is at least partially overlapped with the corresponding one third sub-portion 222. That is, in the embodiment of the present disclosure, one second sub-portion 221, and one data line 31 and one touch line 33 are provided at intervals of the plurality of sub-pixel regions 101 in the second direction Y, and one third sub-portion 222 and one data line 31 are disposed between the other two adjacent sub-pixel regions 101.

In the embodiment of the present disclosure, the width of the first reflective light-shielding portion 21 in the first direction X is greater than the width of the scan line 32 in the first direction X, and the width of the second reflective light-shielding portion 22 in the second direction Y is greater than the sum of the width of the data line 31 in the second direction Y and the width of the touch line 33 in the second direction Y.

Referring to FIG. 3, the light ray emitted by the backlight assembly 40 include a light ray an incident into the sub-pixel region 101 and a light ray b incident into outside region of the sub-pixel region 101. The light ray b is reflected by the reflective light-shielding layer 20 after reaching the reflective light-shielding layer 20 to obtain a light ray c, and the light ray c is reflected by the reflective sheet in the backlight assembly 40 after reaching the backlight assembly 40 to obtain a light ray d, and the light ray d is incident into the sub-pixel region 101, so that the utilization rate of the light rays emitted by the backlight assembly 40 may be improved, more light rays may be incident into the sub-pixel region 101, the light efficiency of the display module is improved, and the brightness of the display module may be improved under a certain power condition, thereby effectively reducing the power consumption of the display module. The reflective light-shielding layer 20 does not affect the exit of the light ray a, that is, does not affect the opening rate of the display module.

Optionally, the ratio of the front projection area of the reflective light-shielding layer 20 on the substrate 10 and corresponding to the display region to the area of the display region is greater than or equal to 25% and less than or equal to 90%. Further, the ratio of the front projection area of the black matrix 61 on the substrate 10 and corresponding to the display region to the area of the display region is greater than or equal to 30%, and less than or equal to 90%.

Further preferably, the ratio of the front projection area of the reflective light-shielding layer 20 on the substrate 10 and corresponding to the display region to the area of the display region is greater than or equal to 25% and less than or equal to 70%.

As shown in the following table, three embodiments M1, M2 and M3 are specifically provided for verifying the gain of the light efficiency of the reflective light-shielding layer 20 in different area ratios in the embodiments of the present disclosure, and the verification samples of the three embodiments are all 6-inch FHD display module. The embodiment M1 adopts with a light shielding layer in the prior art, as shown in FIGS. 1 and 2. The embodiments M2 and M3 adopt the structure of the reflective light-shielding layer 20 in the embodiment of the present disclosure, as shown in FIGS. 4 and 5, only the area proportion of the reflective light-shielding layer 20 in embodiments M2 and M3 is controlled to be different. The estimated light efficiency gain and the measured light efficiency gain results corresponding to the three embodiments shown in Table 1 below are obtained.

TABLE 1

Results of Area Proportion and Light Efficiency Increase of Reflective Light-shielding Layer

| Embodiments | Area proportion | Estimated light efficiency increase | Measured light efficiency increase |
| --- | --- | --- | --- |
| M1 | 7.2% | 1.11% | 1.4% |
| M2 | 23.3% | 3.93% | 3.0% |
| M3 | 66.9% | 12.70% | 10.0% |

The area proportion is a ratio of the area of the reflective light-shielding layer 20 to the area of the display region of the display module; when the area proportion of the reflective light-shielding layer 20 is constant, the light efficiency of the display module is set to A; when the reflective light-shielding layer 20 is not provided in the display module, the light efficiency of the display module is set to B, and the light efficiency gain of the display module is set to (A−B)/B.

As can be seen from the above table, the embodiment M2 and the embodiment M3 effectively increased the area proportion of the reflective light-shielding layer 20 with respect to the embodiment M1. At the same time, when the area proportion of the reflective light-shielding layer 20 reached 23.3% higher, the measured light efficiency gain reached 3% higher than the past, and when the area proportion of the reflective light-shielding layer 20 reached 66.9%, the measured light efficiency gain reached 10%. Therefore, it may be shown that the light efficiency of the display panel may be effectively improved by increasing the area proportion of the reflective light shielding layer 20 in the embodiment of the present disclosure.

In view of the foregoing, in the embodiment of the present disclosure, the reflective light-shielding layer 20 is provided with the second reflective light-shielding portion 22 between the two adjacent sub-pixel regions 101 in the at least one sub-pixel region group 100, so that the reflectivity of the reflective light-shielding layer 20 for the light emitted from the backlight assembly 40 is improved, the utilization rate of the display module 20 for the light emitted from the backlight assembly 40 is improved, the light efficiency of the display module is improved, and the power consumption of the display module is reduced. Both the first reflective light-shielding portion 21 and the second reflective light-shielding portion 22 are disposed outside each of the sub-pixel regions 101 in the embodiment of the present disclosure, so that the reflective light-shielding layer 20 does not affect the light transmission of each of the sub-pixel regions 101 when reflecting the light emitted from the backlight assembly 40. Therefore, the embodiment of the present disclosure improves the backlight utilization rate of the non-opening region and improves the light efficiency of the display module while ensuring the aperture rate of the display module.

Figure 6:
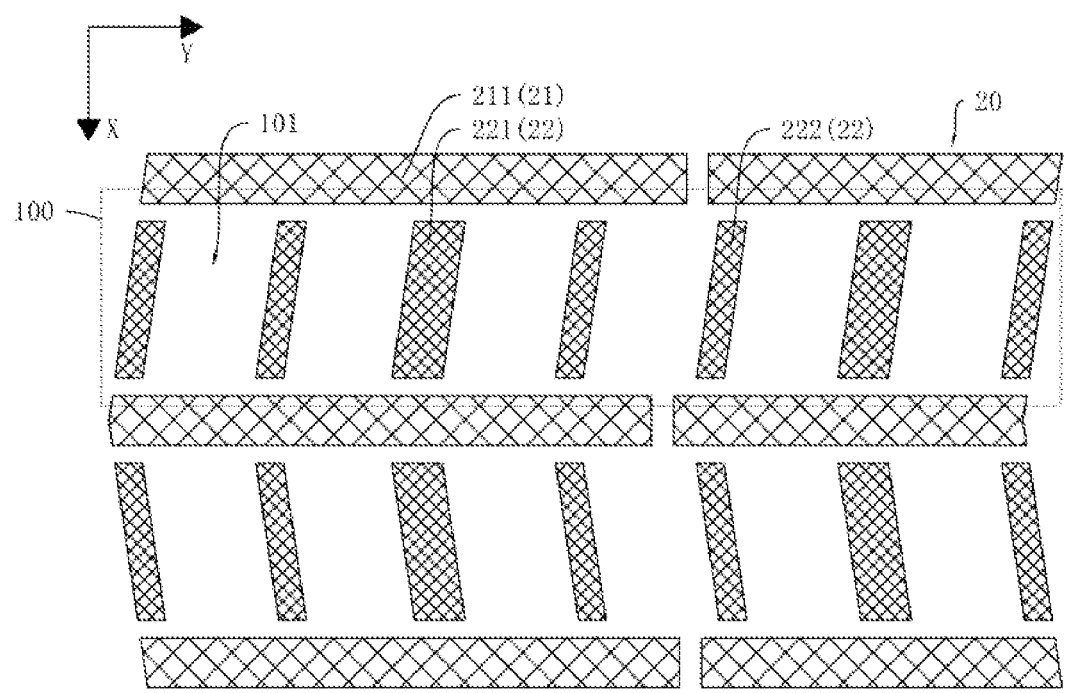
FIG. 6 is a schematic diagram showing another structure of a reflective light-shielding layer according to an embodiment of the present disclosure.
Figure 7:
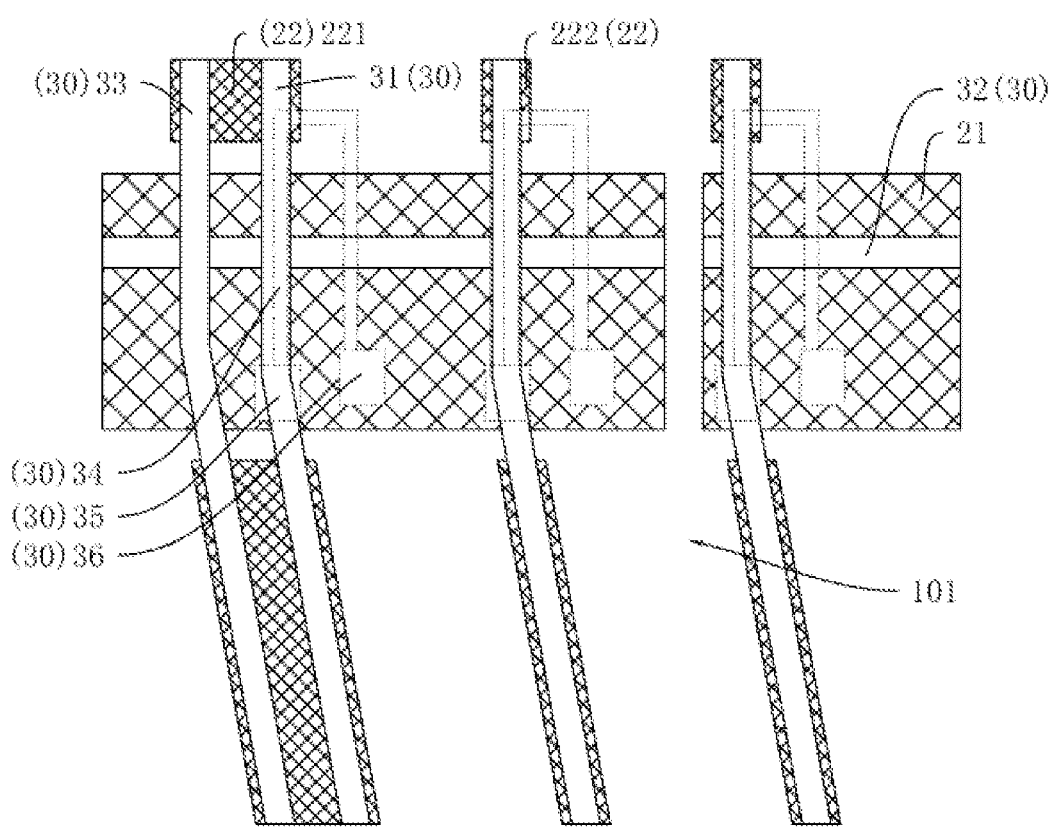
FIG. 7 is a schematic diagram of another planar distribution structure of a reflective light-shielding layer and a thin film transistor layer according to an embodiment of the present disclosure.

In another embodiment of the present disclosure, referring to FIGS. 6 and 7, the present embodiment differs from the previous embodiment in that the first reflective light-shielding portion 21 and the second reflective light-shielding portion 22 are arranged at intervals, and each of the first reflective light-shielding portions 21 includes a plurality of first sub-portions 211 arranged in the second direction Y.

In the present embodiment, since the first reflective light-shielding portion 21 and the scan line 32 have portions overlapping each other, parasitic capacitance is easily generated, and a signal coupling phenomenon is generated, so that a scanning signal transmitted by the scan line 32 is affected. Each of the reflective light-shielding portions 21 is separated into a plurality of first sub-portions 211 in the present embodiment, so that each reflective light-shielding portion 21 is separated into the plurality of first sub-portions 211 having a small area, thereby avoiding electrostatic accumulation of the first reflective light-shielding portion 21 and signal coupling phenomenon between the first reflective light-shielding portion 21 and the scan line 32.

In addition, since the plurality of sub-pixel regions 101 in the display module are usually driven in a column inversion manner (that is, the data signal potentials of the data lines 31 corresponding to the two adjacent sub-pixel regions 101 arranged in the second direction Y are opposite), and the first reflective light-shielding portion 21 is overlapped with the plurality of data lines 31 at the same time, the first reflective light-shielding unit 21 may generate signal coupling phenomenon with both the data lines 31 with the positive and negative potential signals, thereby causing interference between the positive and negative potential signals of the data lines 31. In this embodiment, the first reflective light-shielding portion 21 and the second reflective light-shielding portion 22 are spaced apart, so that the second reflective light-shielding portion 22 and the first reflective light-shielding portion 21 are insulated, that is, the second reflective light-shielding portion 22 has an overlapping portion with only one data line 31, and does not generate a signal coupling phenomenon with the data lines 31 of the positive and negative potential signals at the same time, thereby improving the signal coupling phenomenon between the reflective light-shielding layer 20 and the thin film transistor layer 30 after the area of the reflective light-shielding layer 20 is increased, thereby improving the stability of signal transmission in the thin film transistor layer 30.

Optionally, in the present embodiment, a plurality of first sub-portions 211 in one first reflective light-shielding portion 21 and a plurality of first sub-portions 211 in the other first reflective light-shielding portion 21 are provided in one-to-one correspondence between two adjacent first reflective light-shielding portions 21. At least six sub-pixel regions 101 arranged in the second direction Y are provided between two first sub-portions 211 arranged oppositely in two adjacent first reflective light-shielding portions 21. For example, the six sub-pixel regions 101 may include two pixel units, that is, include two complete red, green, and blue sub-pixels, to which three positive potential signals and three negative potential signals are applied, such that the generated signal coupling between each first sub-portion 211 and the plurality of data lines 31 is canceled; and the number of sub-pixel regions 101 between two adjacent first sub-portions 211 may be an integer multiple of 6, so that the generated signal coupling between each first sub-portion 211 and the plurality of data lines 31 is canceled.

Optionally, the distance between the adjacent first reflective light-shielding portion 21 and the second reflective light-shielding portion 22 is greater than or equal to 1 μm and less than or equal to 3 μm, and the distance between two adjacent first sub-portions 211 in the same first reflective light-shielding portion 21 is greater than or equal to 1 μm and less than or equal to 3 μm.

In view of the foregoing, in the embodiment of the present disclosure, the reflective light-shielding layer 20 is provided with the second reflective light-shielding portion 22 between the two adjacent sub-pixel regions 101 in the at least one sub-pixel region group 100, so that the reflectivity of the reflective light-shielding layer 20 to the light emitted from the backlight assembly 40 is improved, the utilization rate of the display module 20 for the light emitted from the backlight assembly 40 is improved, the light efficiency of the display module may be improved, and the power consumption of the display module may be reduced. The first reflective light-shielding portion 21 and the second reflective light-shielding portion 22 are disposed outside each of the sub-pixel regions 101 in the embodiment of the present disclosure, so that the reflective light-shielding layer 20 does not affect the light transmission of each of the sub-pixel regions 101 when reflecting the light emitted from the backlight assembly 40. Therefore, the embodiment of the present disclosure improves the backlight utilization rate of the non-opening region and improves the light efficiency of the display module while ensuring the aperture rate of the display module. Further, in the embodiment of the present disclosure, the signal coupling phenomenon generated between the reflective light-shielding layer 20 and the thin film transistor layer 30 may be effectively improved by dividing the first reflective light-shielding portion 21 into a plurality of first sub-portions 211 and separating the first reflective light-shielding portion 21 and the second reflective light-shielding portion 22, thereby improving the signal transmission stability in the thin film transistor layer 30 and improving the display effect of the display module.

Figure 8:
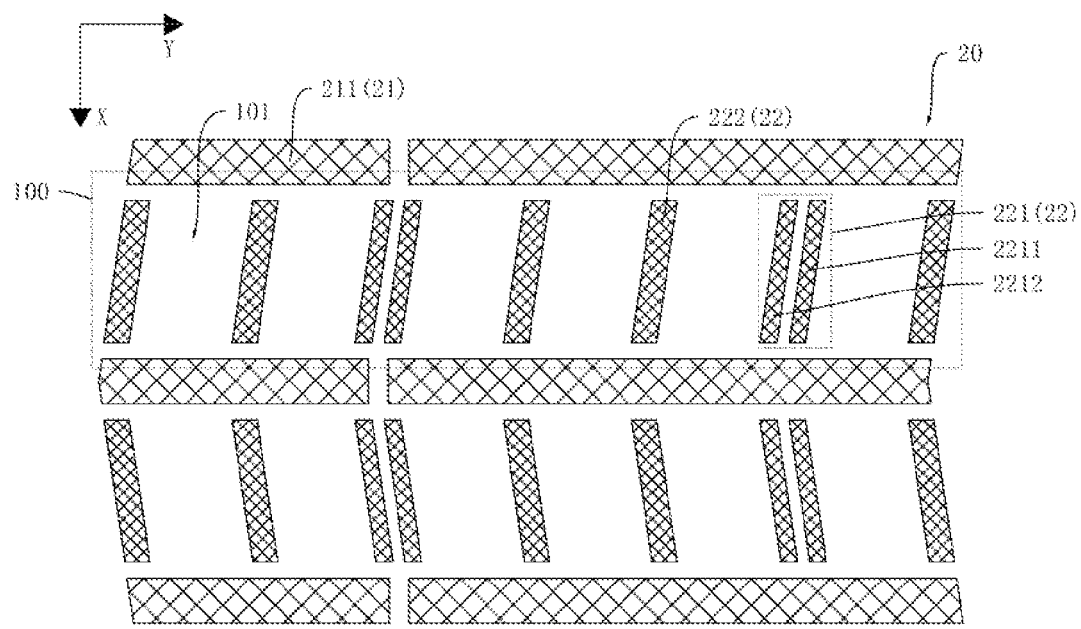
FIG. 8 is a schematic diagram showing another structure of a reflective light-shielding layer according to an embodiment of the present disclosure.
Figure 9:
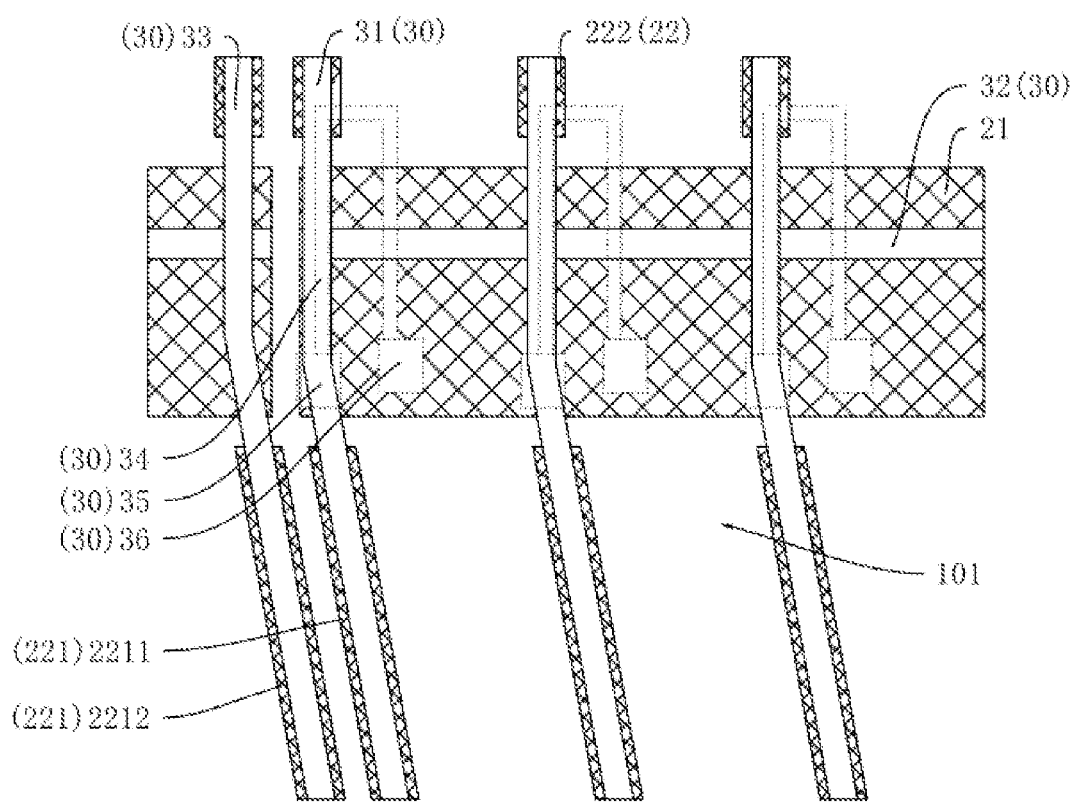
FIG. 9 is a schematic diagram of another planar distribution structure of a reflective light-shielding layer and a thin film transistor layer according to an embodiment of the present disclosure.

In another embodiment of the present disclosure, referring to FIGS. 8 and 9, the present embodiment differs from the previous embodiment in that the second sub-portion 221 includes a first unit 2211 and a second unit 2212 arranged at intervals along the second direction Y, the first unit 2211 and the data line 31 are at least partially overlapped, and the second unit 2212 and the touch line 33 are at least partially overlapped.

Since both the data line 31 and the touch line 33 may easily generate signal coupling with the same second sub-portion 221, the signals transmitted by the data line 31 and the touch line 33 are easily interfered with each other. In the present embodiment, the signals transmitted by the data line 31 and the touch line 33 may be prevented from being interfered with each other by dividing the second sub-portion 221 into the first unit 2211 having an overlapping portion with the data line 31 and the second unit 2212 having an overlapping portion with the touch line 33, thereby improving the signal transmission stability of the data line 31 and the touch line 33, and improving the display effect and the touch effect of the display module.

Alternatively, the distance between the first unit 2211 and the second unit 2212 within the same second sub-portion 221 is greater than or equal to 1 µm and less than or equal to 3 µm.

In view of the foregoing, in the embodiment of the present disclosure, the second reflective light-shielding portion 22 is newly introduce into the reflective light-shielding layer 20 between the two adjacent sub-pixel regions 101 in the at least one sub-pixel region group 100, so that the reflectivity of the reflective light-shielding layer 20 to the light emitted from the backlight assembly 40 is improved, the utilization rate of the display module 20 for the light emitted from the backlight assembly 40 is improved, the light efficiency of the display module may be improved, and the power consumption of the display module may be reduced. The first reflective light-shielding portion 21 and the second reflective light-shielding portion 22 are disposed outside of each of the sub-pixel regions 101 in the embodiment of the present disclosure, so that the reflective light-shielding layer 20 does not affect the light transmission of each of the sub-pixel regions 101 when reflecting the light emitted from the backlight assembly 40. Therefore, the embodiment of the present disclosure improves the backlight utilization rate of the non-opening region and improves the light efficiency of the display module while ensuring the aperture rate of the display module. Further, in the embodiment of the present disclosure, the signal coupling phenomenon generated between the reflective light-shielding layer 20 and the thin film transistor layer 30 may be substantially improved by dividing the first reflective light-shielding portion 21 into a plurality of first sub-portions 211 and separating the first reflective light-shielding portion 21 and the second reflective light-shielding portion 22, thereby improving the signal transmission stability in the thin film transistor layer 30 and improving the display effect of the display module. Moreover, in the embodiment of the present disclosure, the second sub-portion 221 having an overlapping portion with the data line 31 and the touch line 33 is divided into the first unit 2211 and the second unit 2212, so that he signals transmitted by the data line 31 and the touch line 33 may be prevented from being interfered with each other, the signal transmission stability of the data line 31 and the touch line 33 is improved, and the display effect and the touch effect of the display module are improved.

In addition, an embodiment of the present disclosure further provides a display device including a device main body and the display module described in the above embodiment, wherein the device main body and the display module are integrated together.

In the embodiment of the present disclosure, the device main body may include a middle frame, a frame glue, and the like, and the display device may be a display terminal such as a mobile phone, a tablet, a television, or a VR (virtual reality), which is not limited herein.

In the above-mentioned embodiments, the description of each embodiment has its own emphasis, and parts not described in detail in a certain embodiment may be referred to the related description of other embodiments.

A display module and a display device according to an embodiment of the present disclosure have been described in detail above. The principles and implementations of the present disclosure are described in detail here with specific examples. The above description of the embodiments is merely intended to help understand the technical solution and core ideas of the present disclosure. Those of ordinary skill in the art should understand that it is still possible to modify the technical solutions recorded in the foregoing embodiments or perform equivalent replacements to some of the technical features, and these modifications or replacements do not cause the essence of the corresponding technical solutions to deviate from the scope of the technical solutions of the embodiments of the present disclosure.

What is claimed is:

1. A display module, comprising:
   a substrate;
   a reflective light-shielding layer disposed on the substrate, the reflective light-shielding layer comprising a plurality of first reflective light-shielding portions and at least one second reflective light-shielding portion, and the second reflective light-shielding portion comprising a second sub-portion;
   a thin film transistor layer disposed on a side of the reflective light-shielding layer away from the substrate, the thin film transistor layer comprising a plurality of data lines, a plurality of scan lines, and a plurality of touch lines;
a black matrix disposed on a side of the thin film transistor layer away from the reflective light-shielding layer; and
a backlight assembly disposed on a side of the substrate away from the reflective light-shielding layer;
wherein the display module comprises a display region, a front projection of the reflective light-shielding layer on the substrate and corresponding to the display region is disposed within a coverage of a front projection of the black matrix on the substrate and corresponding to the display region, and a ratio of a front projection area of the reflective light-shielding layer on the substrate and corresponding to the display region to a front projection area of the black matrix on the substrate and corresponding to the display region is greater than 20%;
wherein the display module comprises a plurality of sub-pixel region groups disposed in the display region and arranged in a first direction, a plurality of sub-pixel regions arranged in a second direction are disposed in each of the sub-pixel region groups, and the first direction crosses the second direction; and
wherein the first reflective light-shielding portion is disposed between any two adjacent sub-pixel region groups, and the second reflective light-shielding portion is disposed between two adjacent sub-pixel regions in at least one of the sub-pixel region groups; one of the scan lines is disposed between any two adjacent sub-pixel region groups; and one of the touch lines, one of the data lines and one second sub-portion are disposed between any two adjacent sub-pixel regions in each of the sub-pixel region groups, and both the one touch line and the one data line are correspondingly disposed at least partially overlapping with the one second sub-portion.

2. The display module according to claim 1, wherein the ratio of the front projection area of the reflective light-shielding layer on the substrate and corresponding to the display region to the front projection area of the black matrix on the substrate and corresponding to the display region is greater than or equal to 80% and less than or equal to 100%.

3. The display module according to claim 1, wherein the reflective light-shielding layer comprises a plurality of second reflective light-shielding portions, and a second reflective light-shielding portion is disposed between every two adjacent sub-pixel regions in each of the sub-pixel region groups.

4. The display module according to claim 3, wherein each of the first reflective light-shielding portions is disposed between any two adjacent sub-pixel region groups and extends in the second direction; and
each of the second reflective light-shielding portions is disposed between any two adjacent sub-pixel regions in a corresponding sub-pixel region group and between two first reflective light-shielding portions adjacent in the first direction.

5. The display module according to claim 4, wherein a front projection of the data line on the substrate and a front projection of the scan line on the substrate are both located within a coverage of the front projection of the reflective light-shielding layer on the substrate.

6. The display module according to claim 4, wherein each of the second reflective light-shielding portions is connected to and disposed between two first reflective light-shielding portions adjacent in the first direction, so that the plurality of first reflective light-shielding portions and the plurality of second reflective light-shielding portions are disposed around each of the sub-pixel regions.

7. The display module according to claim 4, wherein the first reflective light-shielding portion and the second reflective light-shielding portion are spaced apart from each other.

8. The display module according to claim 7, wherein each of the first reflective light-shielding portions comprises a plurality of first sub-portions arranged at intervals, and the plurality of first sub-portions in the same first reflective light-shielding portion are arranged in the second direction.

9. The display module according to claim 8, wherein a plurality of first sub-portions in one of two adjacent first reflective light-shielding portions and a plurality of first sub-portions in another of the two adjacent first reflective light-shielding portions are disposed in one-to-one correspondence; and
wherein at least six sub-pixel regions arranged in the second direction are disposed between two oppositely disposed first sub-portions of the two adjacent first reflective light-shielding portions.

10. The display module according to claim 4, wherein, the second reflective light-shielding portion further comprises a third sub-portion, and a width of the second sub-portion in the second direction is larger than a width of the third sub-portion in the second direction; and
wherein one data line and one third sub-portion are disposed between any two adjacent sub-pixel regions in each of the sub-pixel region groups, and the one data line is correspondingly disposed at least partially overlapping with the one third sub-portion.

11. The display module according to claim 10, wherein the second sub-portion comprises a first unit and a second unit spaced apart in the second direction, and wherein the first unit is at least partially overlapped with the data line and the second unit is at least partially overlapped with the touch line.

12. The display module according to claim 10, wherein a width of the first reflective light-shielding portion in the first direction is greater than a width of the scan line in the first direction, and a width of the second reflective light-shielding portion in the second direction is greater than a sum of a width of the data line in the second direction and a width of the touch line in the second direction.

13. The display module according to claim 1, wherein the black matrix comprises a plurality of openings, one of the openings corresponds to one of the sub-pixel regions; and
wherein a difference between a distance between two openings adjacent in the first direction and a width of the first reflective light-shielding portion in the first direction is greater than or equal to 0.5 μm and less than or equal to 2 μm; and a difference between a distance between two openings adjacent in the second direction and a width of the second reflective light-shielding portion in the second direction is greater than or equal to 0.5 μm and less than or equal to 2 μm.

14. The display module according to claim 1, wherein the thin film transistor layer further comprises a thin film transistor disposed in the display region, and the reflective light-shielding layer is disposed between the thin film transistor and the substrate.

15. The display module according to claim 1, wherein a ratio of the front projection area of the reflective light-shielding layer on the substrate and corresponding to the display region to an area of the display region is greater than or equal to 25% and less than or equal to 90%.

16. The display module according to claim 15, wherein the ratio of the front projection area of the reflective light-shielding layer on the substrate and corresponding to the display region to the area of the display region is greater than or equal to 25% and less than or equal to 70%.

17. A display device comprising a device main body and a display module, wherein the device main body is integrated with the display module, and the display module comprises:
- a substrate;
- a reflective light-shielding layer disposed on the substrate, the reflective light-shielding layer comprising a plurality of first reflective light-shielding portions and at least one second reflective light-shielding portion, and the second reflective light-shielding portion comprising a second sub-portion;
- a thin film transistor layer disposed on a side of the reflective light-shielding layer away from the substrate, the thin film transistor layer comprises a plurality of data lines, a plurality of scan lines, and a plurality of touch lines;
- a black matrix disposed on a side of the thin film transistor layer away from the reflective light-shielding layer; and
- a backlight assembly disposed on a side of the substrate away from the reflective light- shielding layer;

wherein the display module comprises a display region, a front projection of the reflective light-shielding layer on the substrate and corresponding to the display region is disposed within a coverage of a front projection of the black matrix on the substrate and corresponding to the display region, and a ratio of a front projection area of the reflective light-shielding layer on the substrate and corresponding to the display region to a front projection area of the black matrix on the substrate and corresponding to the display region is greater than 20%;

wherein the display module comprises a plurality of sub-pixel region groups disposed in the display region and arranged in a first direction, a plurality of sub-pixel regions arranged in a second direction are disposed in each of the sub-pixel region groups, and the first direction crosses the second direction; and wherein the first reflective light-shielding portion is disposed between any two adjacent sub-pixel region groups, and the second reflective light-shielding portion is disposed between two adjacent sub-pixel regions in at least one of the sub-pixel region groups; one of the scan lines is disposed between any two adjacent sub-pixel region groups; and one of the touch lines, one of the data lines and one second sub-portion are disposed between any two adjacent sub-pixel regions in each of the sub-pixel region groups, and both the one touch line and the one data line are correspondingly disposed at least partially overlapping with the one second sub-portion.

18. The display device according to claim 17, wherein the ratio of the front projection area of the reflective light-shielding layer on the substrate and corresponding to the display region to the front projection area of the black matrix on the substrate and corresponding to the display region is greater than or equal to 80% and less than or equal to 100%.

19. The display device according to claim 17, wherein the reflective light-shielding layer comprises a plurality of second reflective light-shielding portions, and a second reflective light-shielding portion is disposed between every two adjacent sub-pixel regions in each of the sub-pixel region groups.

20. The display device according to claim 19, wherein each of the first reflective light-shielding portions is disposed between any two adjacent sub-pixel region groups and extends in the second direction; and
- each of the second reflective light-shielding portions is disposed between any two adjacent sub-pixel regions in a corresponding sub-pixel region group and between two first reflective light-shielding portions adjacent in the first direction.

* * * * *